Figure 1:
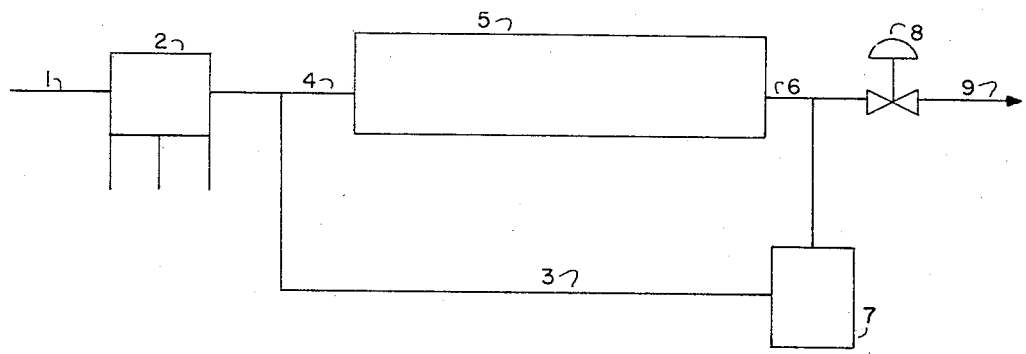

March 12, 1968  E. J. MACKIE ET AL  3,373,148

POLYMERIZATION OF ETHYLENE

Filed July 1, 1965  2 Sheets-Sheet 1

INVENTOR
Edwin J. Mackie
Gordon H. Lovett

BY *C. Ray Holbrook Jr.*

ATTORNEY

3,373,148
POLYMERIZATION OF ETHYLENE
Edwin J. Mackie and Gordon H. Lovett, Texas City, Tex., assignors to Monsanto Company, St. Louis, Mo., a corporation of Delaware
Continuation-in-part of application Ser. No. 179,292, Mar. 16, 1962, which is a continuation-in-part of application Ser. No. 125,655, July 21, 1961. This application July 1, 1965, Ser. No. 472,394
17 Claims. (Cl. 260—87.3)

This application is a continuation-in-part application of application Ser. No. 179,292, filed Mar. 16, 1962, and now abandoned, which is a continuation-in-part of application of application Ser. No. 125,655, filed July 21, 1961, now abandoned.

The present invention relates to an improved process for the catalytic production of ethylene polymers.

It is known that ethylene can be polymerized by subjecting it to the action of high pressures, i.e., pressures in excess of 500 atmospheres under temperatures up to about 400° C. either in the presence or absence of an initiator such as oxygen and/or compounds which generate free radicals. The polymerization reaction is exothermic. Since the temperature increases as the reaction proceeds to a maximum or peak and considerable heat is evolved, successful operation of a continuous polymerization process requires that provision be made for temperature control. The method of temperature control employed must be adequate to avoid an undue rise in temperature which results in violent run-away reactions and explosions. One method for achieving such control involves the use of a long tubular reactor wherein some measure of heat removal is obtained from the relatively large ratio of heat-dissipating surface to reactor volume. Another effective measure for controlling the temperature in such a reactor involves the use of diluents for the ethylene, for example, the use of industrial gases containing ethylene such as cracking still gases. Other suitable techniques which have been proposed include the use of a metal or alloy of high thermal conductivity as the material for construction of the reactor or for lining it, efficient agitation in the system, and the introduction of a cooling medium such as water or benzene or the catalyst solution or suspension into the reactor at intermediate stages throughout the reaction zone. While certain advantages can be gained by employing such techniques, some of them limit significantly the maximum attainable conversion. In fact, in some of the prior art processes, conversion is deliberately kept at a relatively low level in order to achieve optimum control of the reaction under given conditions of temperature, pressure and catalyst concentration. Alternatively, where high levels of conversions are achieved, other problems are introduced such as alteration of polymer properties and/or separation of the polymer from the extraneous materials charged to the reactor for controlling the reaction.

It has now been discovered that effective control of the polymerization reaction can be maintained together with a substantial increase in conversion by recycling at elevated pressures part of the hot reaction mixture from the downstream end of the reactor to the upstream end of the reactor. This recycling technique utilizes the sensible cooling available in the cold incoming ethylene as well as the heat available in the hot reaction mixture recycling from the reactor plus retaining any heat transfer advantage achieved originally. This distribution of heat results in much higher conversions of ethylene to polyethylene in the polymerization reaction. This also enables the polymer to be produced over a wide range of temperatures or over a narrow range of temperatures. The cold incoming ethylene acts as a coolant for the hot reaction mixture as well as a monomer for further polymerization and the hot reaction mixture acts as a heating fluid to bring the feed ethylene up to reaction temperature. The advantages of this technique are obvious over the conventional recycling used at present in most polymerization processes. The conventional recycle technique is to reduce the pressure at the exit of the reactor by means of a pressure valve, separate entrained polymer from ethylene and cool the ethylene in the recycle as the pressure is decreased, and then recompress the clean recycle ethylene stream with fresh ethylene and introduce the entire mixture into the reactor. In a tubular reactor considerable outside heat is then required to bring the ethylene stream to reaction temperature and thus considerable sensible heat is lost which in the present invention is utilized for further conversion of the ethylene to polyethylene.

Furthermore, the process of this invention permits the more efficient utilization of the polymerization initiator. Generally, the amount of ethylene converted to polymer in this rapid reaction at a given temperature and pressure increases with initiator concentration. With this new technique, more efficient utilization of the catalyst to produce the desired product may be obtained by controlling the temperature range over which polymerization occurs; this is accomplished by controlling the fresh incoming ethylene temperature, the recycle reaction temperature, and the weight ratio of these two streams. This control of the reaction temperature profile also allows a polymer product of tailored properties to be produced.

It is an object of the present invention, therefore, to provide a new and improved process for the production of ethylene polymers. Another object of this invention is to provide a continuous method for polymerizing ethylene which provides for higher conversions and permits more accurate control of the reaction. Another object of this invention is to polymerize ethylene to a solid polymer exhibiting a distinctly broader molecular weight distribution. Another object of this invention is to provide a continuous simplified and improved method for the polymerization of ethylene. Another object of this invention is to polymerize ethylene to a solid polymer having improved environmental stress crack resistance and neck-in properties. These and other objects of this invention will become apparent hereinafter from the following description, drawings and appended claims.

According to the present invention, ethylene polymers and copolymers are produced at elevated temperatures and pressures in a continuous process reaction system wherein a part of the total reaction mixture is recycled from the reaction system to a point upstream in the reaction system and fresh feed ethylene and initiator are introduced therein.

Figure 2:
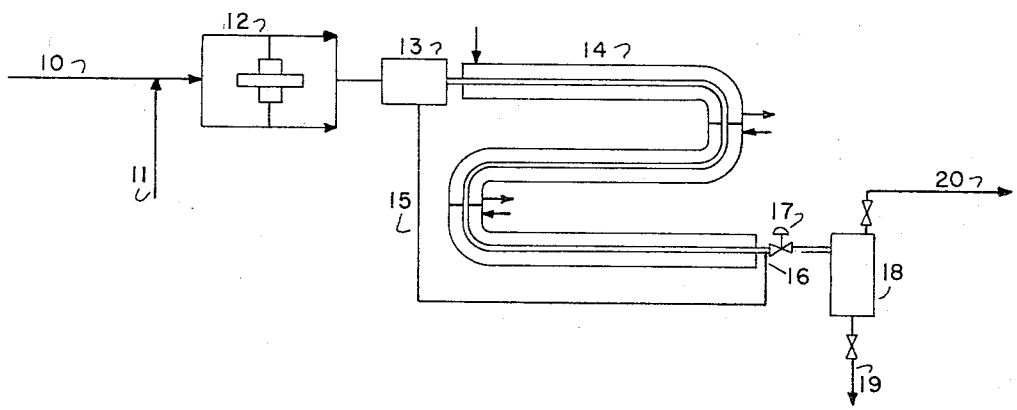
Figure 3:
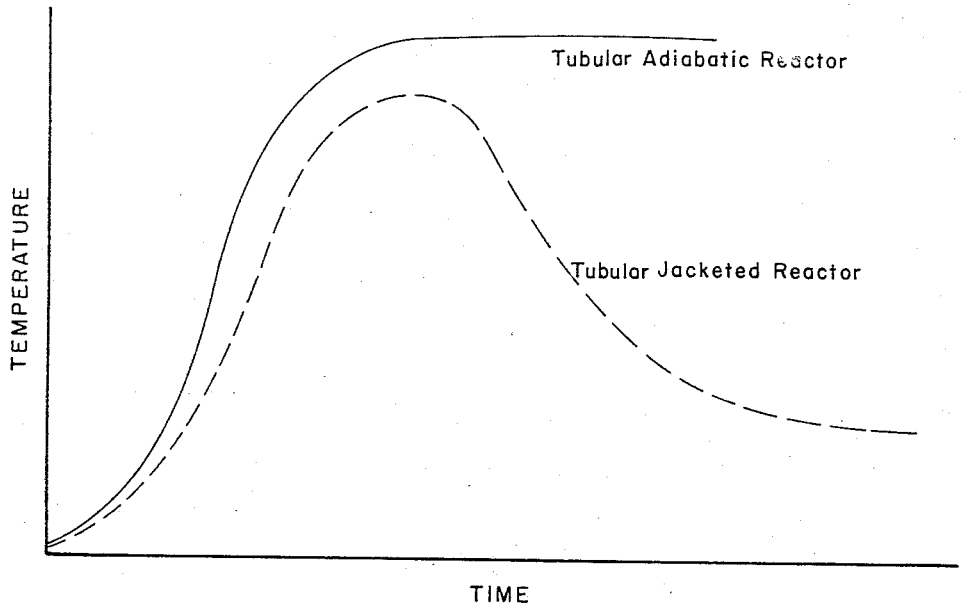
Figure 4:
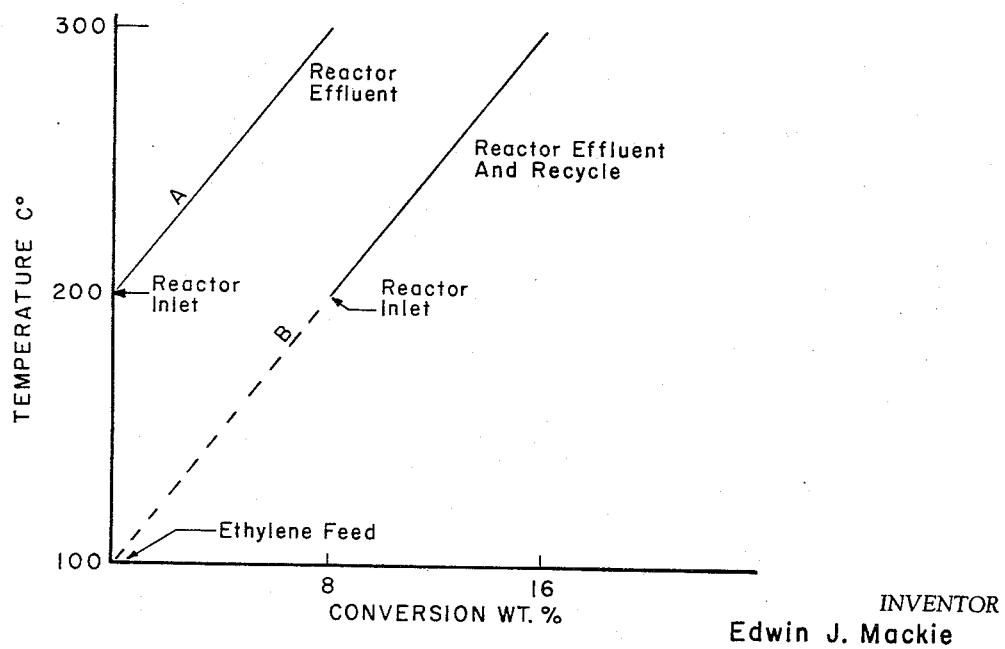

The process of the present invention is shown diagrammatically by the accompanying drawings. FIGURE 1 shows a simple flow diagram employing the present process. FIGURE 2 is a more detailed flow diagram employing the present process in a tubular reactor. FIGURE 3 shows a plot of temperature versus time in a tubular reaction zone. FIGURE 4 is a plot of temperature versus conversion for an adiabatic tubular reactor not employing the present invention and a tubular reactor of the present invention.

In FIGURE 1 a reaction feed stream comprising ethylene and a comonomer, if desired, plus a small amount of oxygen or peroxygen compound as an initiator is introduced through line 1 into compressor 2 and compressed to reaction pressure. The reaction feed stream is mixed with recycle reaction mixture from line 3 and the entire mixture flows through line 4 into elongated reaction zone 5. After polymerization, a portion of the reaction mixture is withdrawn from reaction zone discharge line 6 and recycled by means of pumping device 7 through line 3 to mix with fresh feed ethylene and initiator and enter elongated reaction zone 5 via line 4. The remainder of the reaction mixture from the reaction zone is withdrawn through line 6, pressure let-down valve 8 and line 9 to the polymer recovery equipment, not shown.

FIGURE 2 is a more detailed drawing of a tubular reaction zone for the high pressure polymerization of ethylene wherein the recycle technique of the present invention is utilized. Ethylene from line 10 and initiator from line 11, preferably oxygen, are fed to compressor 12 where the pressure is increased to 15,000 to 50,000 p.s.i. This high pressure gas stream then enters pumping device 13, such as a jet pump, where the recycle reaction mixture from line 15 is mixed with the fresh ethylene and initiator and pumped into tubular reaction zone 14 and then subjected to polymerization conditions. Part of this total reaction mixture leaving the reaction zone is recycled from point 16 to jet pump 13 via line 15 for subsequent polymerization. The remainder of the total reaction mixture is removed from the reaction zone through pressure let-down valve 17. The polymer is then separated from the unreacted ethylene in separator vessel 18 from whence polyethylene is removed via line 19 and unreacted ethylene is recycled to the compressor through line 20.

FIGURE 3 shows the time-temperature plot which would be expected for a tubular adiabatic reactor using an oxygen initiator at about 30,000 p.s.i. The reaction rate can be determined by the change of temperature with time. The reaction rate is dependent upon the temperature, the initiator concentration and the pressure. As the temperature increases, the reaction rate increases. Initiator is, thereby, consumed until the point is reached where the increase in reaction rate due to a higher reaction temperature is just balanced by the reduction in reaction rate due to less initiator. At this time, the reaction will be proceeding at the maximum rate. Thereafter, the reaction rate will drop rapidly as the catalyst concentration falls. The dotted lines in FIGURE 3 show the same plot assuming the tubular reactor has cooling jackets to remove a portion of the heat of reaction.

A simple numerical example of the utility of this recycle system is illustrated in FIGURE 4. Assume that an adiabatic tubular reactor is to be used to make a specific grade of polyethylene. The quality of the product dictates that the reaction temperature must be above 200° C. and below 300° C. Assume further that initiator used in this reaction will initiate polymerization at 150° C.

Curve A on FIGURE 4 shows the concentration of polymer at a point in the reactor versus the reaction temperature at that point for a simple, adiabatic tubular reactor. The reactor inlet temperature is 200° C. The reaction mixture contains only eight percent polymer by the time the temperature reaches 300° C.

Curve B on FIGURE 4 shows the effect of temperature on conversion to polymer for an adiabatic tubular reactor in which one part of hot reaction mixture is recycled from the outlet end of the reactor and mixed with one part of feed ethylene. One part of the recycle at 300° C. is mixed with one part of ethylene at 100° C. to give two parts of 200° C. reaction mixture at the reactor inlet. As before, eight percent of the reaction mixture is converted to polymer as the reaction temperature rises to 300° C. Since there are two parts of reaction mixture for one part of fresh ethylene feed, 16 percent of the fresh ethylene introduced to the reactor is converted to polymer.

In the brief description above, there are benefits other than the higher conversion obtained by recycling hot reaction mixture within the reactor. Without this recycle technique, it was necessary to preheat the feed ethylene to 200° C. and then inject the initiator into the ethylene. If the ethylene containing initiator had been heated to 200° C. in some type of heat exchanger, an appreciable amount of polymer would have been formed between the initiation temperature of 150° C. and the specified reactor inlet temperature of 200° C.

In the recycle case, ethylene at 100° C. is mixed with recycle at 300° C. to give the 200° C. inlet temperature. Since this mixing can be effected very rapidly, the feed ethylene is raised instantaneously to 200° C. and no appreciable amount of polymer is formed in the undesirable temperature range of 150° C. to 200° C.

If cooling jackets had been used in the numerical example above, the conversion of the simple tubular reactor could have been increased over the adiabatic tubular reactor. The conclusion would remain the same: the reactor with one part of recycle for one part of fresh feed would have approximately twice the conversion as the reactor without recycle.

The polymer product made in the recycle process of this invention has outstanding commercial utility for use as a coating resin for forming extrusion coatings on paper and various plastic materials. This particular utility is possible because the polymer has unusually high memory which results in a polymer which has less neck-in. This high memory has been traced to the molecular weight distribution of polymer, i.e., the $M_w/M_n$ or the ratio of weight average molecular weight to number average molecular weight. Surprisingly, even though the difference in temperature between the inlet and outlet ends of the reactor in the recycle process of this invention is reduced, the polymer produced has a broader molecular weight distribution than the polymer produced at equivalent process conditions in a polymerization process without recycle of the polymerization mixture. In addition, the polymer of this invention has improved environmental stress crack resistance so that this polymer is particularly useful in electrical applications as, for example, in forming electrical cables.

The following examples are presented to illustrate the invention but are not to be construed as limiting it in any manner whatsoever.

*Example I*

The polymerization of ethylene is conducted in a pressure-resistant jacketed tubular reactor of FIGURE 2. The tube employed is convolute in form having several sections of approximately equal length. Three thousand three hundred and fifty pounds per hour of fresh ethylene together with about 10 to 50 parts per million of oxygen as an initiator are fed into the tubular reactor through a pumping device such as a jet pump at 40° C. and 30,000 p.s.i. Recycle reaction mixture in an amount of 5,350 pounds per hour from the reactor exit enters the throat of the jet pump and is pumped into the reactor. The total stream consisting of 8,700 pounds per hour of ethylene, polyethylene and oxygen at an average of 180° C. enters the tubular reactor and the ethylene is polymerized to polyethylene. The reaction mass attains a peak temperature of 260° C., some heat being removed by means of a cooling fluid in the reactor tube jackets. Polyethylene in an amount of 840 pounds per hour and 2,515 pounds per hour of unreacted ethylene are withdrawn from the reaction system while 5,350 pounds per hour of the same reaction mixture is recycled from the reactor to the jet pump at the reactor inlet. The polyethylene and unreacted ethylene are removed through a valve to a lower pressure and the polyethylene is recovered as solid polymer. The overall conversion is 25 percent compared with a conversion of 13 percent in a conventional polymerization process wherein no hot reaction mixture is recycled to the reactor inlet.

*Example II*

The polymerization of ethylene and vinyl acetate is conducted in a pressure-resistant jacketed tubular reactor. The tube employed is convolute in form having several sections of approximately equal length. Three thousand three hundred and fifty pounds per hour of fresh ethylene and vinyl acetate in a weight ratio of three parts ethylene to one part vinyl acetate together with about 250 parts per million of lauroyl peroxide and di-tertbutyl peroxide as an initiator are fed into the tubular reactor through a jet pump at 40° C. and 20,000 p.s.i. A recycle stream in the amount of 3,350 pounds per hour, from the reactor exit enters the throat of the jet pump and is forced into the reactor. The total reactor feed stream consisting of ethylene, vinyl acetate, ethylene/vinyl acetate copolymer, and lauroyl peroxide and di-tert-butyl peroxide as initiators at an average temperature of 110° C. and in an amount of 6,700 pounds per hour polymerizes in the tubular reactor.

Example IV

In this example, the molecular weight distribution properties of the polymer of the recycle process of this invention and polymer made under similar process conditions in a polymerization system without recycle were compared. The process equipment described in Example I was used. The polymerization reactions were conducted under the conditions reported in Table I, wherein the recycle process of this invention is identified as Process I and the polymerization process without recycle is identified as Process II.

TABLE I

| Process | Recycle Ratio | Modifier (percent propylene) | Oxygen Initiator, p.p.m. | Pressure, p.s.i. | Jacket Temp., °C. | Melt Index | $M_w$ | $M_n$ | $M_{WD}$ | $(MWD)_I/(MWD)_{II}$ | Memory Percent |
|---|---|---|---|---|---|---|---|---|---|---|---|
| I | 1.0 | 1.1 | 8 | 30,000 | 220 | 0.17 | 328,000 | 33,700 | 9.7 | 1.5 | 34 |
| II | None | 1.1 | 13 | 30,000 | 220 | 0.24 | 256,000 | 39,100 | 6.5 | | 30 |
| I | 1.4 | 2.0 | 6 | 30,000 | 220 | 0.18 | 383,000 | 32,900 | 11.6 | 1.7 | 34 |
| II | None | 2.5 | 11 | 32,000 | 220 | 0.16 | 290,000 | 43,000 | 6.7 | | 31 |
| I | 1.7 | None | 7 | 30,000 | 220 | 0.31 | 1,075,000 | 39,500 | 27.1 | 1.4 | 59 |
| II | None | None | 14 | 27,000 | 220 | 0.23 | 641,000 | 34,200 | 19.0 | | 45 |

The temperature rises to 180° C. but is kept from a higher temperature by a cooling fluid in the reactor tube jackets and by adjusting initiator concentration. Seven hundred pounds per hour of ethylene/vinyl acetate copolymer and 2,650 pounds of unreacted monomer are removed from the reaction system and 3,350 pounds per hour of the reaction mixture are recycled to the jet pump at the reactor inlet. The ethylene/vinyl acetate copolymer and 2,650 pounds per hour of monomers are removed through a valve to a lower pressure and the ethylene/vinyl acetate copolymer is recovered as solid polymer.

Example III

The polymerization of ethylene is conducted in a pressure-resistant autoclave reactor. Three thousand three hundred and fifty pounds per hour of fresh ethylene together with about 10 to 50 parts per million of oxygen as an initiator are fed into the autoclave through a jet pump at 40° C. and 40,000 p.s.i. Eight thousand six hundred pounds per hour of recycle reaction mixture from the reactor exit enter the throat of the jet pump and are pumped into the reactor after having been cooled by passing through a tubular heat exchanger. The total reactor feed stream consisting of 11,950 pounds per hour of ethylene, polyethylene and oxygen at an average temperature of 180° C. polymerizes in the autoclave reactor to polyethylene. The temperature rises to 283° C. during the reaction. Part of the reaction mixture is withdrawn from the reactor, cooled in an external tubular heat exchanger to 250° C. and recycle to the jet pump. Polyethylene in an amount of 840 pounds per hour and 2,515 pounds per hour of ethylene are removed to a lower pressure through a valve and the solid polyethylene is recovered as the final product.

As in the case of Example III, where very little heat is removed through the reactor wall, the heat of reaction must be absorbed as sensible heat in the reaction mixture. With oxygen as an initiator and depending on the pressure, the feed ethylene must reach about 150° C. before the reaction will proceed at a reasonable rate. A temperature of about 300° C. to 350° C. should not be exceeded or the reaction mixture may decompose to carbon and hydrogen and methane. Under these two limitations, the ability of the reactants to absorb the heat of reaction is limited to the sensible heat gain of the reactants between 150° C. and 300° C. Using pure ethylene monomer, a conversion of about 11 percent of the ethylene to polyethylene would be sufficient to raise the temperature 150° C. in an adiabatic reactor.

The weight average molecular weights, $\overline{M}_w$, were measured by the disymmetry light scattering technique using a Sofica light scattering photometer with a specially purified Tetralin solvent which was filtered through a 0.2 micron Gelman filter. The other conditions for these measurements were: temperature 81.5° C., wave length 436 m$\mu$ and $Dn/dc$ 0.0877. The number average molecular weights, $\overline{M}_n$, were measured by the osmotic technique using a model 302 Mechrolab vapor pressure, osmometer with o-dichlorobenzene solvent at a temperature of 130° C. The procedures used for measuring the melt index was that of ASTM D1238–57T. Memory was determined according to Western Electric Material Specification 59035, Issue 9.

The results recorded in Table I show that the memory is significantly higher and the molecular weight distribution (MWD) is substantially broader for the polymer made by Process I, the recycle process of this invention, than by Process II without recycle. The difference in molecular weight distribution is shown in the comparisons of the ratio of molecular weight distribution for Process I to molecular weight distribution for Process II, said ratios being greater than one in each comparison.

Example V

The improvement in environmental stress crack resistance of the polymer made by the recycle process of this invention in comparison with a regular polymer made under similar process conditions is shown in this example. The polymerization reactions were conducted under the conditions reported in Table II in the process equipment described in Example I. In Table II, the recycle process of this invention is identified as Process I and the polymerization process without recycle is identified as Process II. As shown in Table II, the polymer of this invention had an environmental stress crack resistance double that of the ordinary polymer prepared under the same process conditions. The environmental stress crack resistance was measured by the ASTM D193–60T procedure substituting a 20% Hostepal reagent for the 100% Igepal solution.

Example VI

A comparison of the neck-in of the polymer made by the recycle process of this invention and a polymer made under similar process condition without recycle is shown in Table III. The polymers were made under the process conditions recorded in Table III, Process I being the recycle process of this invention and Process II being the polymerization process without recycle using the process equipment described in Example I. Neck-in is the width of the die in inches through which the polymer is extruded minus the width of the ribbon of the film of polymer extruded on paper in inches. The data in Table III was measured at an extrusion rate of 200 ft./min. with a film thickness of 0.5 mil. The extrusion was conducted at a temperature of 600° F. through a 22.5 inch die. As recorded in Table III, the polymer made by the recycle process of this invention has a substantial improvement in neck-in in comparison to the polymer made without recycle.

actor and obtain as good, if not better, results depending on the initiator used and the type of product desired. It is likewise possible and desirable in many cases to inject the fresh ethylene feed at multiple points along the reaction zone either separately or in admixture with initiator. For instance, part of the fresh ethylene feed may be injected at the inlet and as much as ½ or more of the fresh ethylene feed may be injected at one or possibly two or three additional points downstream in the tubular reactor. Furthermore, the fresh feed ethylene and initiator together with recycle reaction mixture can be injected at one or more points in the reaction zone.

TABLE II

| Process | Recycle Ratio | Modifier Mol Percent (propane) | Oxygen Initiator, lb./hr. | Pressure, p.s.i. | Jacket Temperature, °C. | Melt Index | Memory, Percent | Density | Stress Crack, hours |
|---|---|---|---|---|---|---|---|---|---|
| I | 1.8 | 2.5 | 0.04 | 30,000 | 220 | 0.24 | 36 | 0.9238 | 1.2 |
| II | None | 2.5 | 0.068 | 30,000 | 220 | 0.23 | 32 | 0.9236 | 0.6 |

TABLE III

| Process | Recycle Ratio | Modifier Mol Percent (propane) | Oxygen Initiator, lb./hr. | Pressure, p.s.i. | Jacket Temperature, °C. | Melt Index | Density | Web Width, inches | Drawdown, ft./min. |
|---|---|---|---|---|---|---|---|---|---|
| I | 0.5 | 1.5 | 0.03 | 25,000 | 160 | 6.2 | 0.918 | 211⅛ | >580 |
| II | None | 1.5 | 0.03 | 24,000 | 220 | 5.7 | 0.918 | 20½ | >580 |

The important consideration involved in the process of this invention is that the sensible heat capacity of the fresh feed ethylene and the heat that can be transferred through the walls of a tubular reactor are combined in such a manner that a highly desirable heat balance advantage is accomplished. In an autoclave-type polymerization reactor, the sensible heat capacity of the incoming monomer is utilized to result in a conversion to polyethylene, for instance, of approximately 20 percent. However, there is very little heat transfer through the walls of the autoclave reactor and, therefore, only the sensible heat capacity of the incoming ethylene can be utilized. In ordinary tubular type polymerization reactors, the entire mass is sent through the reactor on a once-through basis requiring addition of outside heat to initiate reaction; although unreacted monomer is recycled after cooling, only a portion of the sensible heat of the incoming ethylene can therefore be utilized. There is, however, considerable heat transferred through the walls of the reactor which is removed by means of a cooling fluid in the reactor tube jacket. This type of polymerization reaction has, in the case of polyethylene, resulted in conversions as high as 15 percent. Now for the first time maximum utilization of both of these techniques of heat removal can be accomplished to result in conversions, in the case of polyethylene, of in excess of 25 percent. It should further be noted that this type effect can be realized by recycling the hot reaction mixture to any point upstream in the reaction system as well as by recycling the hot reaction mixture to the inlet of the reaction zone. In both cases, the hot reaction mixture is mixed with fresh ethylene feed whose sensible heat capacity may be utilized to the maximum extent which together with significant heat transfer through the reactor walls results in exceptional and highly desirable increases in conversion of ethylene to polyethylene.

While the examples specify certain conditions for the polymerization reaction, substantial changes can be made from these without departing from the scope of the invention. For example, the tubular reactor need not be convolute in form but may be in any other form, such as straight, for example. Also, while a single elongated tube or autoclave is exemplified, a plurality of similarly constructed reaction tubes or autoclaves can be operated in parallel to obtain greater production.

Although all the examples herein demonstrate the initiator being added at the inlet of the reaction zone with the fresh ethylene feed, it is possible to inject the initiator separately at one or more points downstream in the re- The ratio of recycle reaction mixture to inlet ethylene should be so regulated as to provide a maximum utilization of the sensible heat capacity available in the ethylene while at the same time effecting maximum heat distribution to begin the polymerization reaction and polymerize the incoming ethylene. If only a small amount of recycle is used, the feed ethylene will not be raised to the reaction temperature and additional heat must be added either to the feed ethylene or to the reaction mixture. A large amount of recycle will keep the polymerization temperature range in the reactor small, but an increased amount of energy is required to effect the recycle. Accordingly, the ratio of recycle reaction mixture to inlet feed ethylene should be in the range from about 0.1 to about 10.0. Preferably, ratios of recycle reaction mixture to inlet ethylene should be from about 0.5 to about 4.0 for economy of operation and maximum production of polyethylene of the desired properties. The recycle need not be the same bulk composition as the reaction mixture. If the reaction mixture consists of two or more phases, it is preferable to recycle the phase with the lower viscosity since the higher viscosity phase contains most of the recoverable polymer. The recycle need not be taken near the exit of the reactor. In a tubular reaction zone, is can be withdrawn from any point in the reaction zone where the temperature is above the polymerization initiation temperature, that is, about 100° C. to 200° C. or higher, depending on the catalyst system employed, and recycled to a point upstream in the reaction system where the reaction mixture is subjected to further polymerization. By reaction system is meant that part of the system from the compressor to the pressure let-down valve where the proper temperature can start the polymerization. This may be upstream of the tubular reaction zone where preheating is perhaps carried out. In a preferred embodiment of this invention, the recycle reaction mixture is withdrawn from the reactor at a point downstream from the point where the peak temperature of the reaction mixture occurs in the reactor and recycled to the inlet of the reactor.

Alternatively, and to maintain the high effectiveness of the process, the hot reaction mixture may be withdrawn from a point in the reactor where the polymerization rate has passed the period of maximum rate and is recycled to a point in the reactor where the monomer has not reached the maximum polymerization rate. Broadly, the recycle method can also be defined as withdrawing hot reaction mixture from the reaction zone and recycling it to a point in the reactor upstream and at higher pressure than the point at which the reaction mixture was withdrawn.

The desired temperature of the fresh ethylene feed depends upon the ratio of the latter to the recycle reaction mixture and should be kept as low as possible to secure maximum cooling. Ethylene cooled to below ambient temperature may be used to provide a large heat reservoir. Ethylene heated above ambient temperature may be used in order to control the polymerization temperature range. However, the temperature at which the fresh ethylene is fed can be used as one factor to govern the resultant temperature of the reaction mixture after mixing with the recycle reaction mixture. The desired temperature of the total mixture entering the reaction zone depends to some extent upon the particular initiator employed in the system. Di-tert-butyl peroxide, for example, generates free radicals at about 140° C. and, therefore, permits the temperature of the reaction mixture to be as low as 140° C. Higher mixing temperatures are required, however, for example, about 160° C. to 200° C. with oxygen as the initiator, and lower ones, for example, 120° C., can be used with lauroyl peroxide as the initiator. It is possible to use an initiator which has an initiation temperature as low as 100° C. Mixture of initiators such as lauroyl peroxide and di-tert-butyl peroxide have some advantage also because of the difference in their decomposition temperatures which results in the generation of free radicals at different temperature levels and insures continuity of the reaction by providing a more uniform concentration of free radicals. The mixing temperature can be calculated as a function of inlet feed temperature and the recycle temperature. Generally, inlet ethylene is maintained at a temperature from about 10° C. to about 100° C. although temperatures down to 0° C. and even lower, for example, as low as −50° C. to −100° C., can be employed in some instances. The recycle reaction mixture can best be utilized when the temperature is in the range from about 220° C. to about 350° C. although temperatures down to about 200° C. and even lower, for example, 100° C., can be employed within the scope of this invention. Preferably, the temperature of the inlet ethylene is a temperature which will permit the peak temperature of the reaction mixture to be reached upstream of the point in the reactor from which the reaction mixture is withdrawn for recycle. When operating in the preferred manner, it may be necessary to either heat or cool the inlet ethylene and this heating or cooling is ordinarily conducted in accordance with the temperature measured for the mixture of free ethylene and recycle reaction mixture.

Although a so-called jet-pump is exemplified in the examples, any type of high-pressure, high-capacity, recirculating pump, such as a rotary gear or centrifugal pump, may be employed in the practice of this invention. However, a jet pump of the type hereinafter described is generally preferred for this operation even though there undoubtedly is some solid material present in the reaction mixture. Surprisingly, the solid particles do not foul and obstruct the extremely small diameter diffuser opening of the jet pump. The jet pump suitable for use in this invention is a device whereby a fluid may be pumped by the action of a high-velocity jet of that fluid or another fluid. The pumping action is a result of a transfer of momentum from the jet fluid to the fluid being pumped. As a jet of fluid penetrates a stagnant or slowly moving fluid, a dragging action occurs on the boundary of the jet between the jet fluid and low-velocity fluid, and transfer of momentum accelerates the latter in the direction of the flow. As the two flows progress, the mixed stream spreads until all entrained fluid has been mixed with the primary jet. In the present invention, the inlet feed ethylene is the jet fluid and the recycle polyethylene-ethylene mass is the slow moving entrained fluid.

The conditions of temperature and pressure are those commonly employed in the polymerization of ethylene and may vary over a wide range. Depending upon the initiator used, the temperature may vary from 40° C. to about 400° C. It is generally preferred to operate at temperatures in the range from about 110° C. to about 300° C. Pressures in the range from 5,000 p.s.i. to 60,000 p.s.i. can be used with those ranging from about 15,000 to 40,000 p.s.i. being preferred.

In addition to the oxygen and peroxides exemplified, any organic or inorganic compound which generates free radicals or a mixture of such compounds is suitable for use as the initiator or catalyst. Among examples of such materials are per-oxygen type compounds such as hydrogen peroxide, dialkyl dioxides like diethyl peroxide and ditertiary-butyl peroxide, butyryl peroxide, lauroyl peroxide, benzoyl peroxide, alkyl-hydroperoxides, diperoxy dicarbonate esters, tert-alkyl percarboxylates such as tert butyl perbenzoate, potassium persulfate, and the like; azo-bis (isobutyronitrile); azines such as benzalazine; oximes such as acetone oxide; etc. Particularly suitable are mixtures of the per-oxygen type compounds such as, for example, lauroyl peroxide and di-tert-butyl peroxide in various proportions.

The initiator is usually employed in the form of a gas such as, for example, oxygen or in a solution or suspension in a solvent such as benzene, for example. Only small amounts of initiator are required. Generally, initiator concentration will vary from about 0.0005 percent to about 2 percent of the total weight of monomer material charged to the polymerization reactor. The initiator may be introduced into the reactor with the ethylene at the inlet, or may be injected at other points in the reactor. One advantage of the present invention is that it permits more efficient utilization of the initiator.

Polymerization modifiers, sometimes called chain transfer agents, may be used or not as desired. It is well known that the properties of ethylene polymers may be "tailored" to a significant extent by conducting the polymerization of the ethylene in the presence of certain compounds ordinarily referred to as modifiers. Among the many such compounds may be mentioned saturated hydrocarbons, or a mixture of such hydrocarbons, examples of which are paraffins, both straight chain and branched chain, such as ethane, propane, n-butane, isopentane, cycloparaffins such as cyclohexane and alkyl-cycloparaffins such as methyl-cyclohexane; alcohols such as tert-butyl alcohol; aromatic hydrocarbons such as toluene, xylene; etc., olefinic hydrocarbons such as propylene and butene; and various other compounds such as acetone, hydrogen, carbon dioxide, and phenolic compounds. The amount of modifier used is generally within the range from about 0.5 percent to about 10 percent by weight of the ethylene feed. The advantages of the process of the present invention can be gained in polymerization systems using such modifiers as well as in those wherein no modifiers are employed.

Although only the production of one copolymer has been exemplified by the examples along with the production of homopolymers by the polymerization of ethylene, any copolymer containing as much as 50 percent polyethylene as one of the major constituents is within the scope of this invention. For example, copolymers of ethylene and other vinyl esters such as ethyl acrylate or vinyl proprionate can be produced by the process of this invention. In addition, copolymers of ethylene and any olefin having not more than about eight carbon atoms such as propylene or butene-1 can be produced by this method. Other compounds which may be copolymerized with ethylene at high pressures by this method are acrylonitrile and vinyl chloride.

What is claimed is:

1. In a process for the manufacture of ethylene polymers in an elongated reaction zone at high pressures in the range from 5,000 to 60,000 p.s.i. and elevated temperatures in the presence of a free-radical initiator for the polymerization, the improvement which comprises recycling hot reaction mixture from at least one point in the reaction zone where the polymerization rate has passed the period of maximum rate to at least one point in the reaction system where the monomer has not yet reached the maximum polymerization rate and introducing fresh feed ethylene and initiator into the reaction system.

2. In a process for the manufacture of ethylene polymers in an elongated polymerization zone into which ethylene-containing monomer and free-radical initiator are introduced at elevated pressures in the range from 5,000 to 60,000 p.s.i. to establish flow through said elongated polymerization zone and elevated temperatures continuously increasing from the inlet of said elongated polymerization zone to form a polymerization mixture containing polymer and unpolymerized monomer, the improvement comprising withdrawing said polymerization mixture from said elongated polymerization zone at at least one point where the temperature is above the polymerization initiation temperature and introducing said withdrawn polymerization mixture into said elongated polymerization zone at at leasst one point upstream where said withdrawn polymerization mixture is subjected to further polymerization.

3. The process of claim 2 wherein said point where said polymerization mixture is withdrawn from said elongated polymerization zone is where the temperature is in excess of 100° C.

4. The process of claim 2 wherein said point where said polymerization mixture is withdrawn from said elongated polymerization zone is near the outlet of said elongated polymerization zone.

5. The process of claim 2 wherein said point where said polymerization mixture is withdrawn from said elongated polymerization zone is adjacent the point where the peak temperature occurs in said elongated polymerization zone.

6. The process of claim 2 wherein said ethylene-containing monomer is ethylene and a comonomer selected from the group consisting of an olefin having not more than 8 carbon atoms per molecule and a vinyl ester.

7. The process of claim 2 wherein said point where said withdrawn polymerization mixture is introduced into said elongated polymerization zone is near the inlet of said elongated polymerization zone.

8. The process of claim 2 wherein said point where said withdrawn polymerization mixture is introduced into said elongated polymerization zone is where polymerization begins in said elongated polymerization zone.

9. In a process for the polymerization of ethylene-containing monomer in an elongated polymerization zone in the presence of a free-radical initiator at elevated pressures and temperatures which are continuously increasing from the inlet of said elongated polymerization zone, the improvement comprising introducing said free-radical initiator and ethylene-containing monomer at a pressure in the range of 5,000 to 60,000 p.s.i. as a jet stream first into a slowly moving fluid zone and then into said elongated polymerization zone, polymerizing said ethylene-containing monomer in said elongated polymerization zone to form a polymerization mixture containing polymer and unpolymerized monomer, withdrawing polymerization mixture from said elongated polymerization zone at a point where the temperature is above the polymerization initiation temperature, introducing said withdrawn polymerization mixture into said slowly moving fluid zone to form a body of slowly moving fluid, and transferring momentum from said jet stream of said ethylene-containing monomer to said polymerization mixture in said slowly moving fluid zone to thereby accelerate said polymerization mixture in the direction of flow of said jet stream of ethylene-containing monomer and recycle said withdrawn polymerization mixture into the inlet of said elongated polymerization zone.

10. In a process for the polymerization of ethylene-containing monomer in an elongated tubular reactor in the presence of free-radical initiator at elevated pressures and temperatures, said temperatures in said elongated tubular reactor continuously increasing from the inlet of said elongated tubular reactor continuously increasing from the inlet of said elongated tubular reactor to reach a peak temperature, the improvement comprising introducing said free-radical initiator and ethylene-containing monomer at a pressure in the range of 5,000 to 60,000 p.s.i. as a jet stream first into a slowly moving fluid zone and then into said elongated tubular reactor, polymerizing said ethylene-containing monomer in said elongated tubular reactor to form a polymerization mixture containing polymer and unpolymerized monomer, withdrawing polymerization mixture from said elongated tubular reactor at a point where the temperature is above the polymerization initiation temperature, introducing said withdrawn polymerization mixture into said slowly moving fluid zone to form a body of slowly moving fluid, and transferring momentum from said jet stream of said ethylene-containing monomer to said polymerization mixture in said slowly moving fluid zone to thereby accelerate said polymerization mixture in the direction of flow of said jet stream of ethylene-containing monomer and recycle said withdrawn polymerization mixture into the inlet of said elongated tubular reactor.

11. The process of claim 10 wherein said point where said polymerization mixture is withdrawn from said elongated tubular reactor is where the temperature is in excess of 100° C.

12. The process of claim 10 wherein said point where said polymerization mixture is withdrawn from said elongated tubular reactor is near the outlet of said elongated tubular reactor.

13. The process of claim 10 wherein said point where said polymerization mixture is withdrawn from said elongated tubular reactor is downstream from the peak temperature in said elongated tubular reactor.

14. The process of claim 10 wherein the ratio of said withdrawn polymerization mixture to said ethylene-containing monomer is in the range of 0.1 to 10.0.

15. In a process for the polymerization of ethylene-containing monomer in an elongated tubular reactor in the presence of a free-radical initiator at elevated pressures and temperatures, said temperatures in said elongated tubular reactor continuously increasing from the inlet of said elongated tubular reactor to reach a peak temperature, the improvement comprising introducing said free-radical initiator and ethylene-containing monomer at a pressure in the range of 5,000 to 60,000 p.s.i. as a jet stream first into a slowly moving fluid zone and then into said elongated tubular reactor, polymerizing said ethylene-containing monomer in said elongated tubular reactor to form a polymerization mixture containing polymer and unpolymerized monomer, withdrawing polymerization mixture from said elongated tubular reactor at a point where the temperature is above the polymerization initiation temperature, introducing said withdrawn polymerization into said slowly moving fluid zone to form a body of slowly moving fluid, transferring momentum from said jet stream of said ethylene-containing monomer to said polymerization mixture in said slowly moving fluid zone to thereby accelerate said polymerization mixture in the direction of flow of said jet stream of ethylene-containing monomer and recycle said withdrawn polymerization mixture into the inlet of said elongated tubular reactor, detecting the temperature of the mixture of said ethylene-containing monomer and withdrawn polymerization mixture at the inlet of said elongated tubular reactor, and regulating the temperature of said ethylene-containing monomer to maintain the peak temperature in said elongated tubular reactor upstream of the point where said polymerization mixture is withdrawn.

16. In a process for the polymerization of ethylene-containing monomer in an elongated tubular reactor in the presence of a free-radical initiator at elevated pressures and temperatures, said temperatures in said elongated tubular reactor continuously increasing from the inlet of said elongated tubular reactor to reach a peak temperature, the improvement comprising introducing said free-radical initiator and ethylene-containing monomer at a pressure in the range of 5,000 to 60,000 p.s.i. as a jet stream first into a slowly moving fluid zone and then into said elongated tubular reactor, polymerizing said ethylene-containing monomer in said elongated tubular reactor to form a polymerization mixture containing polymer and unpolymerized monomer, withdrawing a first portion of said polymerization mixture from said elongated tubular reactor at a point where the temperature is above the polymerization initiation temperature, introducing said first portion of said withdrawn polymerization mixture into said slowly moving fluid zone to form a body of slowly moving fluid, transferring momentum from said jet stream of said ethylene-containing monomer to said polymerization mixture in said slowly moving fluid zone to thereby accelerate said polymerization mixture in the direction of flow of said jet stream of ethylene-containing monomer and recycle said first portion of withdrawn polymerization mixture into the inlet of said elongated tubular reactor, withdrawing a second portion of said polymerization mixture from said elongated tubular reactor at a point downstream from the point where said first portion of polymerization mixture is withdrawn, and recovering solid polymer from said second portion of withdrawn polymerization mixture.

17. The process of claim 2 wherein said ethylene-containing monomer is essentially only ethylene.

References Cited

UNITED STATES PATENTS

| | | | |
|---|---|---|---|
| 2,330,118 | 9/1943 | Frey | 196—2 |
| 2,769,804 | 11/1956 | Hanson | 260—86.7 |
| 2,852,501 | 9/1958 | Richard | 260—94.9 |
| 3,184,444 | 5/1965 | Eilbracht | 260—94.9 |

FOREIGN PATENTS

| | | |
|---|---|---|
| 550,088 | 8/1956 | Belgium. |
| 585,741 | 6/1960 | Belgium. |
| 591,527 | 12/1960 | Belgium. |

JOSEPH L. SCHOFER, *Primary Examiner.*

F. L. DENSON, *Assistant Examiner.*

UNITED STATES PATENT OFFICE
CERTIFICATE OF CORRECTION

Patent No. 3,373,148                          March 12, 1968

Edwin J. Mackie et al.

It is hereby certified that error appears in the above numbered patent requiring correction and that the said Letters Patent should read as corrected below.

Column 4, line 24, "$M_w/M_n$" should read -- $\overline{M}_w/\overline{M}_n$ --.

Column 5, line 4, "di-tertbutyl" should read -- di-<u>tert</u>-butyl --. Columns 5 and 6, TABLE I, heading to columns 8, 9 and 10, "$M_w$", "$M_n$" and "$M_{WD}$" should read -- $\overline{M}_w$ --, -- $\overline{M}_n$ --, and -- MWD --. Column 5, line 6, "recycle" should read -- recycled --. Column 6, line 38, "procedures" should read -- procedure --; line 72, "condition" should read -- conditions --; Columns 7 and 8, TABLE III, in the column headed "Web Width, inches"

| 211 1/8 | should read | 21 1/8 |
|---------|-------------|--------|
| 201 1/8 |             | 20 1/2 |

Column 11, line 22, "leasst" should read -- least --. Column 12, lines 4 and 5, cancel "continuously increasing from the inlet of said elongated tubular reactor"; lines 56 and 57, after "polymerization" insert -- mixture --.

Signed and sealed this 2nd day of September 1969.

(SEAL)
Attest:

EDWARD M. FLETCHER, JR.                    WILLIAM E. SCHUYLER, JR.
Attesting Officer                             Commissioner of Patents